Patented Feb. 21, 1928.

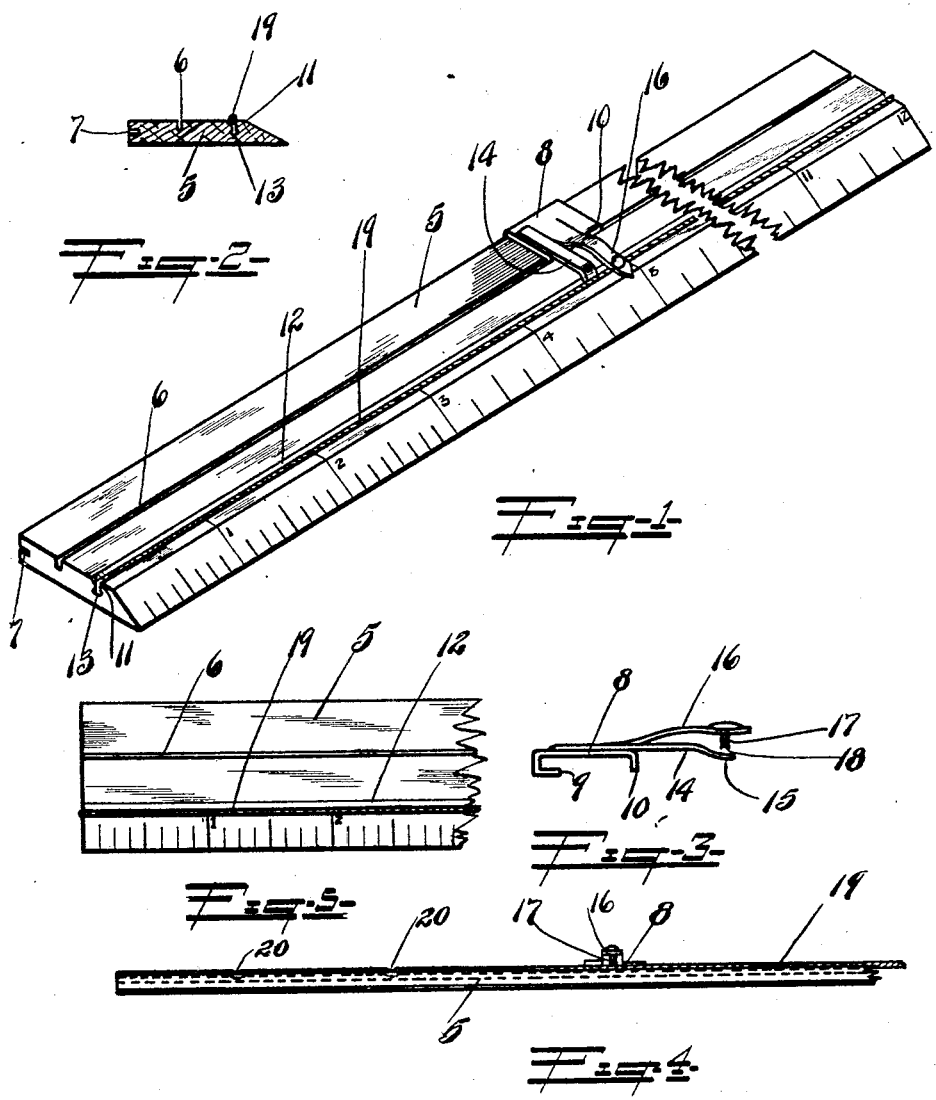

1,659,739

UNITED STATES PATENT OFFICE.

ARTHUR L. KUHLMAN, OF BAY CITY, MICHIGAN.

RECORDING RULE.

Application filed December 23, 1926. Serial No. 156,714.

This invention relates to measuring devices such as rules and the like.

One object of the invention is to design a rule with which a number of measurements can be taken, and each measurement visibly indicated and recorded consecutively, so that they can be copied or transferred after the measuring is completed.

Another object is to design a rule having slidable means for quickly erasing the recorded measurements, preparatory to further use of the rule, and for the recording of other measurements.

A further object of the invention is to provide a simple, economical and convenient rule by means of which measurements can be made and recorded and then removed at the option of the user.

With the above and other objects in view, the present invention consists in the combination and arrangement of parts, hereinafter more fully described, illustrated in the accompanying drawing, and particularly pointed out in the appended claims, it being understood that changes may be made in the form, size, proportion and minor details of construction, without departing from the spirit, or sacrificing any of the advantages of the invention.

In the drawing:

Fig. 1. is an isometric view of my improved rule.

Fig. 2. is a transverse sectional view thereof.

Fig. 3. is an enlarged edge view of the indicating mechanism.

Fig. 4. is a fragmentary front edge view of the rule, measurements already taken being indicated and shown thereon.

Fig. 5 is a top plan fragmentary view showing a slightly different construction.

In making measurements of any nature, and particularly when several are made, the rule or measuring device is placed on the surface or article to be measured, a measurement is taken, which must then be transferred to paper, or it must be mentally recorded, and succeeding measurements must be treated in a like manner, if recorded on paper for further use, the measuring is interrupted to allow for this recording, if recorded mentally, the factor of forgetting enters, and I have therefore designed a rule on which several measurements can be recorded and which are visible to the eye, so that they can be collectively transferred, copied or otherwise handled as desired without fear of error.

Referring now particularly to the drawing in which I have shown the preferred embodiment of my invention, the numeral 5 indicates the body of the rule which can be of any convenient shape, design or length, and the indicia thereon can be in any desired place convenient to the eye and use for which the rule is designed, and in the present instance I have shown (in Figs. 1, 2 and 4 of the drawings) a rule having a beveled front edge on which the indicia is placed, but it will be clearly understood that it may also be square as shown in Fig. 5. of the drawing, or of any other desired shape.

Grooves 6 and 7 are formed in the top and edge respectively, of the rule, and serve as a guide for the indicating member 8 which is slidably mounted on the face of the said rule, said indicator being in the form of a stamping, the rear edge of which is bent down and inwardly, the horizontally bent lip 9 being adapted to travel in the groove 7. Similar downwardly bent lips 10 are provided on the front edge of the indicator and engage and travel in the groove 6 formed on the upper surface of the rule, and these grooves serve to hold the indicator in place and permit it being shifted for recording the measurements taken.

A similar groove 11 is formed in the face of the rule directly adjacent to and spaced from the groove 6, one edge thereof being slightly beveled as shown at 12, the bottom of the groove being enlarged as shown at 13, and for a purpose to be presently described.

An elongated leg or member 14 projects from the body of the indicator, and is soldered or otherwise secured thereto, the end being bent as shown at 15 to adhere closely to the beveled surface 12 and spans the groove 11. A resilient tempered raised finger or finder 16, is formed integral with the indicator and projects beyond the groove 11 and over the indicia provided on the face of the rule, a pin 17 being securely mounted thereon the end being cupped as shown at 18.

A cord 19 is anchored to the ends of the rule in any approved manner, and lies directly over the groove 11, riding on the bent end 15 of the member 14, and being directly beneath the pin 17 and is adapted for engagement thereby.

In the actual practise of making measurements, the indicator is shifted to the end of the rule towards the numeral "1", it is then shifted in the opposite direction until the finder 16 is directly over the proper point or measurement, the user then places the thumb or finger on said finder, pressing down until the pin 17 engages the cord 19 and forces or wedges it into the groove as clearly shown in Fig. 4. of the drawing, that particular measurement is then visibly marked or indicated, the indicator is then shifted to the next measurement, and the operation repeated, until all of the measurements have been taken, the user then has all of the measurements visible before him and can then transfer to paper or dispose of as desired. To clear the rule the user slides the indicator member again towards the starting point, and the leg 14 will automatically lift the cord free from the groove, and the record of measurements on the rule will be entirely destroyed.

From the foregoing description it will be obvious that I have perfected a very simple, economical and convenient rule, on which a number of measurements can be recorded, and from which they can be quickly and easily erased.

What I claim is:—

1. A rule having a finder slidably mounted thereon, and flexible means mounted on the rule and engageable by said finder for visibly recording a measurement on said rule.

2. A rule having an indicator slidably mounted thereon, a resilient finder mounted on the indicator, flexible means secured on said rule and adapted to be engaged by said finder for visibly recording a measurement on said rule.

3. A rule having an indicating member slidably mounted thereon, a resilient finder mounted on said indicator, flexible means secured on said rule beneath said finder, and adapted to be engaged thereby for recording a measurement, and means for removing said indicated measurement.

4. A rule provided with a groove in the face thereof, a flexible member stretched over said groove and anchored to the ends of the rule, and an indicating member slidably mounted on the rule and provided with a pin for wedging said flexible member into said groove.

5. A rule provided with a groove in the face thereof, a flexible member stretched over said groove and normally out of engagement therewith, an indicator slidably mounted on said rule and adapted to engage said flexible member to wedge it into said groove at certain points, means on the indicator for normally holding the flexible member out of engagement with the groove, said means being also adapted to release said wedged portions.

6. A rule provided with a groove in the face thereof, flexible means positioned over said groove and anchored to said rule, an indicator slidably mounted on the rule and provided with a pin adapted when actuated to force said flexible member into said groove at selected points, and means for removing said member from said groove.

7. A rule provided with a groove in the face thereof, a flexible member anchored to the rule and positioned over said groove, an indicator slidably mounted on the rule, a finder on said indicator and a pin therein adapted when actuated to force said member into said groove at a point beneath the finder, and means on the indicator for automatically releasing said flexible member from the groove when the indicator is shifted.

In testimony whereof I hereunto affix my signature.

ARTHUR L. KUHLMAN.